(12) United States Patent
Ugolin

(10) Patent No.: US 10,829,837 B2
(45) Date of Patent: Nov. 10, 2020

(54) METHOD USING PLASMA-COUPLED SOLAR THERMAL ENERGY AND RELATED DEVICE

(71) Applicant: Nicolas Ugolin, Paris (FR)

(72) Inventor: Nicolas Ugolin, Paris (FR)

( * ) Notice: Subject to any disclaimer, the term of this patent is extended or adjusted under 35 U.S.C. 154(b) by 994 days.

(21) Appl. No.: 15/116,723

(22) PCT Filed: Feb. 6, 2015

(86) PCT No.: PCT/FR2015/050294
§ 371 (c)(1),
(2) Date: Aug. 4, 2016

(87) PCT Pub. No.: WO2015/118278
PCT Pub. Date: Aug. 13, 2015

(65) Prior Publication Data
US 2016/0348211 A1 Dec. 1, 2016

(30) Foreign Application Priority Data
Feb. 7, 2014 (FR) ...................................... 14 50978

(51) Int. Cl.
*C22B 21/02* (2006.01)
*B01J 19/12* (2006.01)
(Continued)

(52) U.S. Cl.
CPC ............... *C22B 21/02* (2013.01); *B01J 8/087* (2013.01); *B01J 8/10* (2013.01); *B01J 19/087* (2013.01);
(Continued)

(58) Field of Classification Search
CPC .... C22B 21/02; C22B 21/0053; B01J 19/087; B01J 19/088; B01J 19/126; B01J 19/127;
(Continued)

(56) References Cited

U.S. PATENT DOCUMENTS

2010/0258429 A1* 10/2010 Ugolin .................. B01J 8/0055
204/157.43
2013/0126329 A1 5/2013 Zhu
(Continued)

FOREIGN PATENT DOCUMENTS

EP  1 970 431 A1  9/2008
FR  2 945 033 A1  11/2010
(Continued)

OTHER PUBLICATIONS

International Search Report, dated May 15, 2015, from corresponding PCT Application.

*Primary Examiner* — Colleen P Dunn
*Assistant Examiner* — Anthony M Liang
(74) *Attorney, Agent, or Firm* — Nixon & Vanderhye

(57) ABSTRACT

A microwave thermosolar method and device used in a tubular reactor (110) includes a conveyor for substrates defined as materials thus conveyed. According to this method, a step is provided for circulating an electric current in the conveyor in order to produce heat in this conveyor by Joule effect and optionally to cause, in the substrates, at least some of the following: curing, pyrolyses, gasifications, fusions and chemical reactions including oxidation-reduction reactions, under the action of the electric current.

5 Claims, 14 Drawing Sheets

(51) Int. Cl.
  *B01J 19/08* (2006.01)
  *C10B 7/10* (2006.01)
  *C22B 21/00* (2006.01)
  *B01J 19/20* (2006.01)
  *C10B 19/00* (2006.01)
  *C10B 23/00* (2006.01)
  *C10L 9/08* (2006.01)
  *B01J 8/08* (2006.01)
  *B01J 8/10* (2006.01)
  *C10K 3/00* (2006.01)

(52) U.S. Cl.
  CPC ............ *B01J 19/088* (2013.01); *B01J 19/126* (2013.01); *B01J 19/127* (2013.01); *B01J 19/20* (2013.01); *C10B 7/10* (2013.01); *C10B 19/00* (2013.01); *C10B 23/00* (2013.01); *C10K 3/001* (2013.01); *C10L 9/083* (2013.01); *C22B 21/0053* (2013.01); *B01J 2208/00389* (2013.01); *B01J 2208/00415* (2013.01); *B01J 2219/083* (2013.01); *B01J 2219/0809* (2013.01); *B01J 2219/0822* (2013.01); *B01J 2219/0839* (2013.01); *B01J 2219/0841* (2013.01); *B01J 2219/0871* (2013.01); *B01J 2219/1206* (2013.01); *C10L 2290/02* (2013.01); *C10L 2290/06* (2013.01); *Y02E 50/15* (2013.01); *Y02P 20/134* (2015.11); *Y02T 50/678* (2013.01)

(58) Field of Classification Search
  CPC .............. B01J 19/20; B01J 2208/00389; B01J 2208/00415; B01J 2208/0809; B01J 2208/0822; B01J 2208/083; B01J 2208/0839; B01J 2208/0841; B01J 2208/0871; B01J 2208/1206; B01J 8/087; B01J 8/10; C10B 19/00; C10B 23/00; C10B 7/10; C10K 3/001; C10L 2290/02; C10L 2290/06; C10L 9/083; Y02E 50/15; Y02P 20/134; Y02T 50/678
  See application file for complete search history.

(56) References Cited

U.S. PATENT DOCUMENTS

2014/0305033 A1   10/2014   Chataing
2015/0322349 A1   11/2015   Ugolin

FOREIGN PATENT DOCUMENTS

| WO | 2009/098375 | A1 | 8/2009 |
| WO | 2011/100689 | A2 | 8/2011 |
| WO | 2013/068459 | A1 | 5/2013 |
| WO | 2013/160467 | A1 | 10/2013 |
| WO | 2013/160471 | A2 | 10/2013 |

* cited by examiner

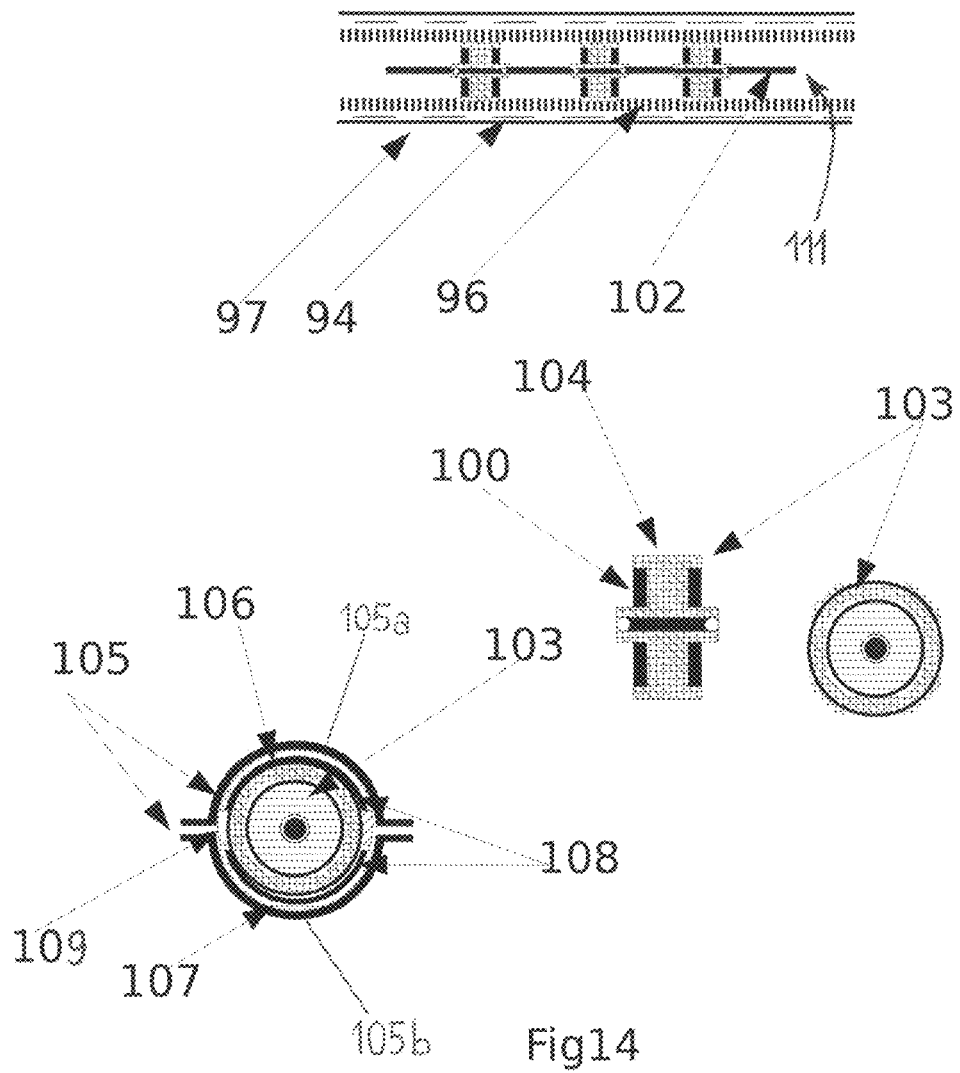

METHOD USING PLASMA-COUPLED SOLAR THERMAL ENERGY AND RELATED DEVICE

BACKGROUND OF THE INVENTION

Field of the Invention

The invention relates to a microwave thermosolar method. A device related to this method is also concerned, in that it enables it to be implemented. Preferential examples of structural elements useful for this are presented below.

Favourably, the method will use solar thermal energy coupled with plasmas to produce a liquid fuel and dihydrogen from carbon compounds.

Description of the Related Art

The exhaustion of petroleum resources and the carbon dioxide ($CO_2$) pollution generated by the combustion of petroleum products (one of the main causes of climate warming) are giving rise to the development of less polluting alternative energy production methods, making it possible to preserve the comfort of life of industrialised countries and to deal with the ever increasing demand for energy in emerging countries. The worldwide energy consumption was 5500 Mtep in 1971 and 10,300 Mtep in 2002 and is estimated at 16,500 Mtep for 2030.

It is necessary however to distinguish:
firstly the energy requirements intended for industrial and urban development, which we can term static (for which numerous solutions are emerging. Essentially solar, nuclear, water, geothermal, wind, etc production units);
secondly, the energy requirements related to transport, which require the storage and transport of the energy by the vehicle itself, except for electric rail vehicles such as trains and trams, etc.

For the second requirement related to transport, the solutions appear to be much less obvious since the fuel or fuels used in the various transport modes must meet a plurality of constraints.

They must be easily transportable and storable under safety conditions at least equivalent to what currently exists for petroleum products, must have a pollution balance (manufacture-use) less than that of hydrocarbons, and finally must be economically viable compared with petroleum products. The problem is further complicated by taking into account the constraints of a fuel compatible with air transport.

Various methods are emerging for producing fuel for vehicles:
the production of biofuel (alcohol, ester),
the use of dihydrogen as a fuel in fuel cells, or thermal engines,
the use of high-performance batteries in electric vehicles,
the use of biomass or coal for producing fuel.

The production of biofuel, alcohol or fatty acid ester appears at first sight to be promising and is already established in various countries. However, these solutions are not perfect because the surface areas to be cultivated for offering energy sufficiency are colossal, representing more than all the surfaces currently cultivated. Because of this, these cultivations are coming into competition with food cultivations. The raw materials for producing these biofuels are often food products such as maize, wheat, etc. Intense use of biofuels of this type, in addition to unbalancing the worldwide food economy, in particular that of emerging and developing countries, would be a strong factor in the risk of famine and significant ecological disturbances.

In addition, some methods for producing these biofuels have very low energy efficiency and a high pollution balance compared with petroleum. For example, we can cite the production of ethanol from beetroot, or the production of fatty acids or esters from colza.

The use of dihydrogen as a fuel seems to be an elegant solution for a fuel that is clean in use. However, the problem with the production of non-polluting dihydrogen at a cost price equivalent to petroleum products has not yet been solved. In addition, the use of this fuel requires removing many obstacles for storage and distribution thereof having regard to its danger.

The storage of electrical energy in batteries that will be used in electrical or mixed electrical/thermal vehicles is one of the solutions proposed by many automobile manufacturers. This solution involves the production of high-performance batteries at low cost that do not cause pollution, or only a little, whether for their manufacture or their recycling. In addition, the problem of the production of an alternative fuel remains for vehicles with mixed electrical/thermal propulsion.

To our knowledge, no viable aeronautical propulsion solution based on fuel cells or electric batteries has been proposed up to the present time.

The use of biomass and in particular plant waste, cellulose or unprocessed agricultural products represents a major raw material source for manufacturing liquid fuels, as well as for plastics materials that cannot be recycled at the end of their life. More generally, all moist carbonaceous resources represent a considerable resource that is still very poorly exploited.

The reserves of fossil coal may make it possible to satisfy the requirements for liquid fuel for several decades yet.

However, whether for biomass or fossil coal, the gasification methods used for manufacturing liquid fuel from these raw materials are still too polluting in terms of $CO_2$, which may represent 20% to 40% of the gases produced.

Because of this loss of carbon in the form of $CO_2$, the production of fuel from biomass by gasification presents a pollution balance that is only slightly favourable compared with petroleum, which quickly becomes unfavourable if the difficulties in controlling the $CO_2$ emissions during the production of biomasses and transportation thereof to the conversion factories are not controlled. By minimising the carbon losses in the form of $CO_2$ during the production of fuel from biomass, this balance could be brought to equilibrium or close thereto, if it is managed to sequester the $CO_2$ produced or to convert it into fuel with better yield. This is because, under these conditions, the biomasses would fix a proportion of carbon equivalent to that released during the combustion of the synthesised fuel.

For fossil coal, the solution is quite different. Whatever the method of converting coal into fuel, the combustion of the fuel will discharge into the atmosphere $CO_2$ coming from the fossil coal, in addition to the undesirable by-products (sulphur, sulphide, etc).

A gasification method without discharge of $CO_2$ will improve the pollution balance of the fuels obtained compared with petroleum products. However, to make the pollution balance of fuels of fossil origin equivalent to the balance of fuels coming from biomass, solutions involving sequestration or transformation of the $CO_2$ will have to be established at biofuel utilisation sites, that is to say the vehicles themselves.

More and more, methods allowing the transformation of $CO_2$ into useful product are being developed; however, very few of them describe solutions suited to the biomass or coal gasification industry.

Two major types of method for transforming $CO_2$ can be cited:
- Catalytic methods consisting of producing the $CO_2$ in compounds such as methanol, formaldehyde or formic acid that can directly be processed.
- Gaseous-phase electrochemical methods consisting of reducing the $CO_2$ into carbon monoxide CO and dihydrogen $H_2$ under the action of electrical discharges.

It should be noted that there exist chemical methods in solution for transforming the $CO_2$ into formic acid.

Although reprocessible industrially, methanol, methanal and formic acid allow the synthesis of hydrocarbons by methods such as the Fischer-Tropsch (FT) process only with great difficulty.

Gaseous-phase electrochemical methods can produce CO and $H_2$ from $CO_2$ gas. Gliding arc (GlidArc™; registered trademark) methods are particularly promising although still great consumers of energy (several kilowatts per m³ of gas produced). The GlidArc™ methods described for the moment often require, to reduce the $CO_2$, the use of additive gases such as sulphuric acid ($H_2S$) or methane ($CH_4$). These methods are not described for oxidising particles of synthetic coal or coal. The additives promoting the reactions are always gases. The geometries described for the GlidArc™ methods make it very difficult to optimise the yields of the various reactions according to the flows of the various gases. The GlidArc™ methods generate plasmas said to be imbalanced. No description reports mixed methods concomitantly or alternatively involving an imbalanced plasma with a thermodynamic plasma. Likewise, no study has reported methods involving plasmas of optical origin, imbalanced electrical plasmas and thermodynamic plasmas. No study reports reaction-orientation methods taking place in a plasma by enrichments with metals, particles or catalyst, thus making it possible to promote such and such a reaction in a plasma.

The reduction of $CO_2$ into CO and $H_2$ is a major technological key in the hydrocarbon synthesis industry. This is because a major part (30% to 40%) of the raw material (coal, synthetic coal) is lost in a form of $CO_2$, which, in addition to the economic cost, makes this industry extremely polluting.

Through the patent application PCT/FR 2008/001606, a method and a series of alternative devices were described, suited to the gasification of even moist carbonaceous compounds, moist biomasses and coal, making it possible to produce a syngas ($CO_2$—$H_2$) while reducing the energy costs taken on the biomass or coal for synthesis. Moreover, through another patent application, WO 2013/160471 A, a Fischer-Tropsch synthesis method was described.

BRIEF SUMMARY OF THE INVENTION

Devices and an organisation of reactors improving the implementation of the various methods described in the aforementioned patents are proposed here.

In addition, the geometry of this novel reactor and the method of functioning thereof can easily be adapted for the production of aluminium by the reduction of alumina using mixed electrical and solar energy, some of the electrical energy moreover being able to be produced from thermosolar energy.

The energy necessary for producing aluminium by reduction of alumina $Al_2O_3$ by means of conventional electrolysis techniques is 13.5 MWh/tonne of aluminium produced, instead of 5.56 MWh/tonne expected for the oxidation-reduction reaction proper. The additional energy comes from the energy necessary for melting the reaction mixture in an electrolysis bath and the losses generated by the Joule effect. The use of a solar furnace, adapted from the pyrolysis solar furnace, described in the present application, makes it possible to use solar energy coupled optionally with microwaves in order to achieve the molten or semi-molten state of the bath, electrolysis being used in a second step for effecting the reduction. After the reduction of the alumina into aluminium, the heat of the molten bath can be recovered to produce electricity.

The electrolysis bath and the reduced and molten metal then fulfil the role of a heat-transfer fluid in a tubular thermostatic reactor.

The gasification method is broken down, after an optional step of preparation of the substrate, into:

A) a first step of pyrolysis/torrefaction of the compounds, into synthetic coal and pyrolysis gas, in a microwave solar reactor, caused by heating of the compounds, contained in said microwave solar reactor by means of synergic thermal energy conjointly provided firstly by the heating of the walls of the reactor by means of the concentration by convergence or reflection of solar radiation on the surface of said walls, and secondly by microwaves injected directly inside the reactor and compounds, and B) a second step of transformation of the synthetic coal and pyrolysis gases, coming from the microwave solar reactor, mainly into CO and $H_2$, by oxidation-reduction chemical reactions occurring in a cyclone reactor, said cyclone reactor allowing the formation of a gaseous vortex entraining and oxidising the particles of synthetic coal by means of the combustion of the pyrolysis gases or additional gas, the injection into the cyclone reactor of heated gases or mixtures of gases, a heating of the gases present directly in said reactor under the action of microwaves injected directly into the cyclone reactor, the heating of the gases being able to go as far as the obtaining of gas plasma.

The microwave thermosolar method of the invention is implemented in a tubular reactor comprising a conveyor for substrates defined as materials thus conveyed, characterised in that it comprises a step of circulation of an electric current in the conveyor, in order to produce heat in this conveyor by Joule effect and optionally to induce, in the substrates, under the action of the electric current, at least some of the following: curing, pyrolyses, gasifications, fusions and chemical reactions comprising oxidation-reduction reactions.

As developed below, this method will preferably be such that:
- a fusion of the substrates, which will comprise the elements necessary for obtaining an electrolysis medium for the reduction, into aluminium, of alumina contained in these substrates, will be carried out, under the action of at least one energy from solar energy, microwave energy and the thermal energy produced by the circulation of electric current in the substrate conveyor;
- and/or aluminium will be fused in the reactor, under the action of at least one energy from among solar energy, microwave energy and the thermal energy produced by the circulation of electric current in the conveyor.

As for the microwave thermosolar device itself, it will comprise:
- a tubular reactor comprising a conveyor for substrates defined as materials thus conveyed,
- and means for circulating an electric current in the conveyor, in order to produce therein heat by Joule effect and optionally to induce, in the substrates, under the action of the electric current, at least some of the following: curing, pyrolyses, gasifications, fusions and chemical reactions comprising oxidation-reduction reactions.

Moreover, in accordance with the invention, this device will advantageously have all or some of the following features:
- the conveyor will comprise a helical worm comprising elements fitted together by dovetails or keys, said fitted-together elements being disposed along an axis of the device, and suspension elements for supporting and rotating the worm, such as shoes and springs;
- and/or the conveyor will comprise a system of successive palets connected together by a cable or a chain, said palets being adjusted to the inside diameter of the tubular reactor so that the substrates are trapped between two successive palets and are pushed through the reactor in order to traverse it,
- and/or an entrance and optionally an exit for the substrates of the reactor will be provided by a system comprising at least two cylinders fitted together and rotating in opposite directions, in order to transfer the substrates from the upstream end of the system to the downstream end of the system, without mixing of atmospheres between upstream and downstream,
- and/or an entrance and optionally an exit for the substrates of the reactor will be provided by a system comprising two discs placed one above the other, respectively a top disc and a bottom disc, each having an opening, said openings being disposed at different positions on the discs so as to pass in alternation in front of a transit chamber so as to alternately isolate said chamber from a space upstream of the top disc and a space downstream of the bottom disc, so that the substrates can pass through the transit tube without mixing of atmospheres between upstream and downstream,
- and/or the substrate conveyor will be foldable in a container,
- and/or the conveyor will be disposed on a carriage comprising optionally orientable wheels, optionally comprising jacks for making the carriage level and optionally motorised for solar tracking by rotation of the carriage,
- and/or, for an oxidation-reduction reaction comprising the reduction of alumina into aluminium, the reactor, which has a tubular wall, will comprise a peripheral electrode situated at said tubular wall of the reactor, preferentially a cylindrical electrode, put to a negative potential, forming a cathode, said peripheral electrode preferably being covered with carbon or in contact with carbon particles optionally injected into the reactor, a second central positive electrode forming an anode being disposed at the centre of the reactor, preferentially at the conveyor, so that said conveyor then comprises carbon inserts forming a consumable electrode,
- and/or, for an oxidation-reduction reaction comprising the reduction of alumina into aluminium, the tubular reactor will comprise a top part and a bottom part, the top part of the reactor comprising an anode top electrode and the bottom part of the reactor comprising a bottom electrode, the electrodes being separated by electrically insulating elements,
- and/or the electrodes will be covered with carbon in order to form consumable electrodes,
- and/or at least some of these electrodes will be made from at least one of the following materials: tantalum, tantalum alloy, platinum or platinum alloy, iron alloy containing platinum or tantalum, steel containing platinum or tantalum.

Implementation of the method can take place in a pyrolysis/torrefaction microwave solar reactor and a cyclone reactor where, preferably:
- the pyrolysis/torrefaction microwave solar reactor comprises among other things:
  - a pipe, for example made from refractory material,
  - means for moving the compounds inside the pipe of the pyrolysis/torrefaction microwave solar reactor,
  - means for concentrating solar radiation and making it converge on the surface of the pipe of the reactor,
  - means for isolating the pipe of the reactor from the external environment,
  - means for improving the thermal inertia of the pipe of the reactor,
  - means for producing microwaves,
  - means for guiding the microwaves,
- the cyclone reactor comprises among other things:
  - at least two cyclone units placed one above the other or fitted together, communicating with each other,
  - devices allowing combustions that cause gas vortices in the units,
  - devices for the lateral or tangential injection of gas into the units, causing gaseous vortices,
  - means for producing and guiding microwaves,
  - means for producing and guiding infrared radiation.

Implementation of the method will also and preferably involve, among other things:
- a heating reactor for pressurising and accelerating the oxidation gases, comprising:
- a pipe, for example made from refractory material,
- means for concentrating solar radiation and making it converge on the surface of the pipe of the reactor,
- means for isolating the pipe from the external environment,
- means for improving the thermal inertia of the pipe of the reactor,
- means for moving the gases and optionally the particles along the pipe of the reactor, while compressing, heating them and accelerating them such as, without being exhaustive, bladed rotors, centrifugal compressors, turbines, at least one annular chamber, at least one microwave source optionally completed by an infrared source,
- means generating electric currents, induced or not, lenses, microwaves, for producing gaseous plasmas and/or gas/particle mixed plasmons,
- at least one magnetron and at least one waveguide for producing microwaves at between 1 gigahertz and 300 gigahertz and guiding said microwaves.

BRIEF DESCRIPTION OF THE DRAWINGS

The following description is given in relation to FIGS. 1 to 14 attached, which illustrate various details of favoured non-limitative example embodiments in order to disclose in detail the essential features of the solution presented here.

DETAILED DESCRIPTION OF THE PREFERRED EMBODIMENTS

Figure 1:
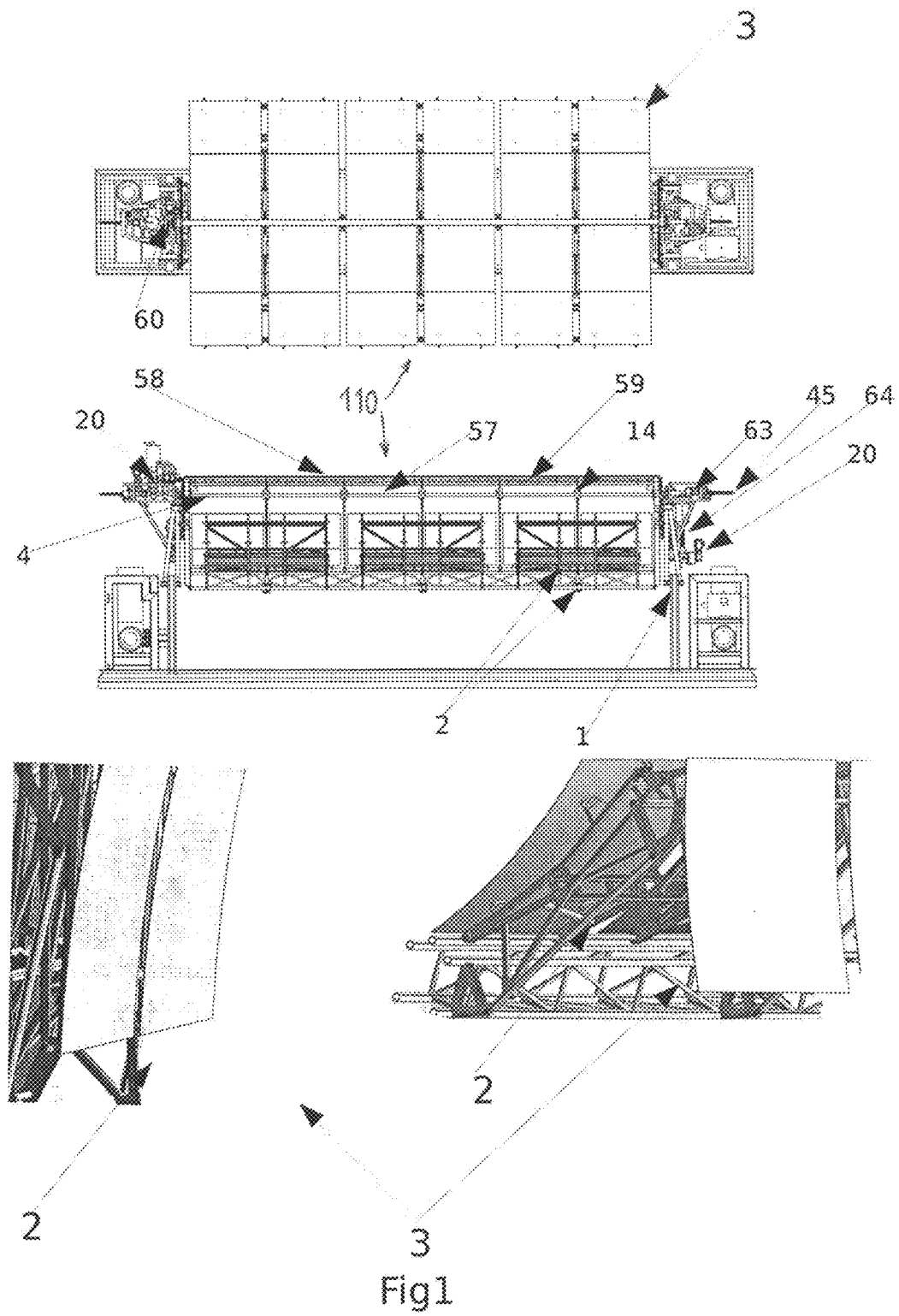

Thus various improvement devices for implementing the methods presented above are described below:

In a particular embodiment, the solar/microwave part (F_smo) can be folded in a container such as lifting systems actuated by motors (F1.1) for lifting the solar/microwave reactor to a height or to lower it, and articulated systems and jacks for unfolding and folding the mirrors FIG. 1.3 of the F_smo (see FIG. 1.2).

Figure 10:
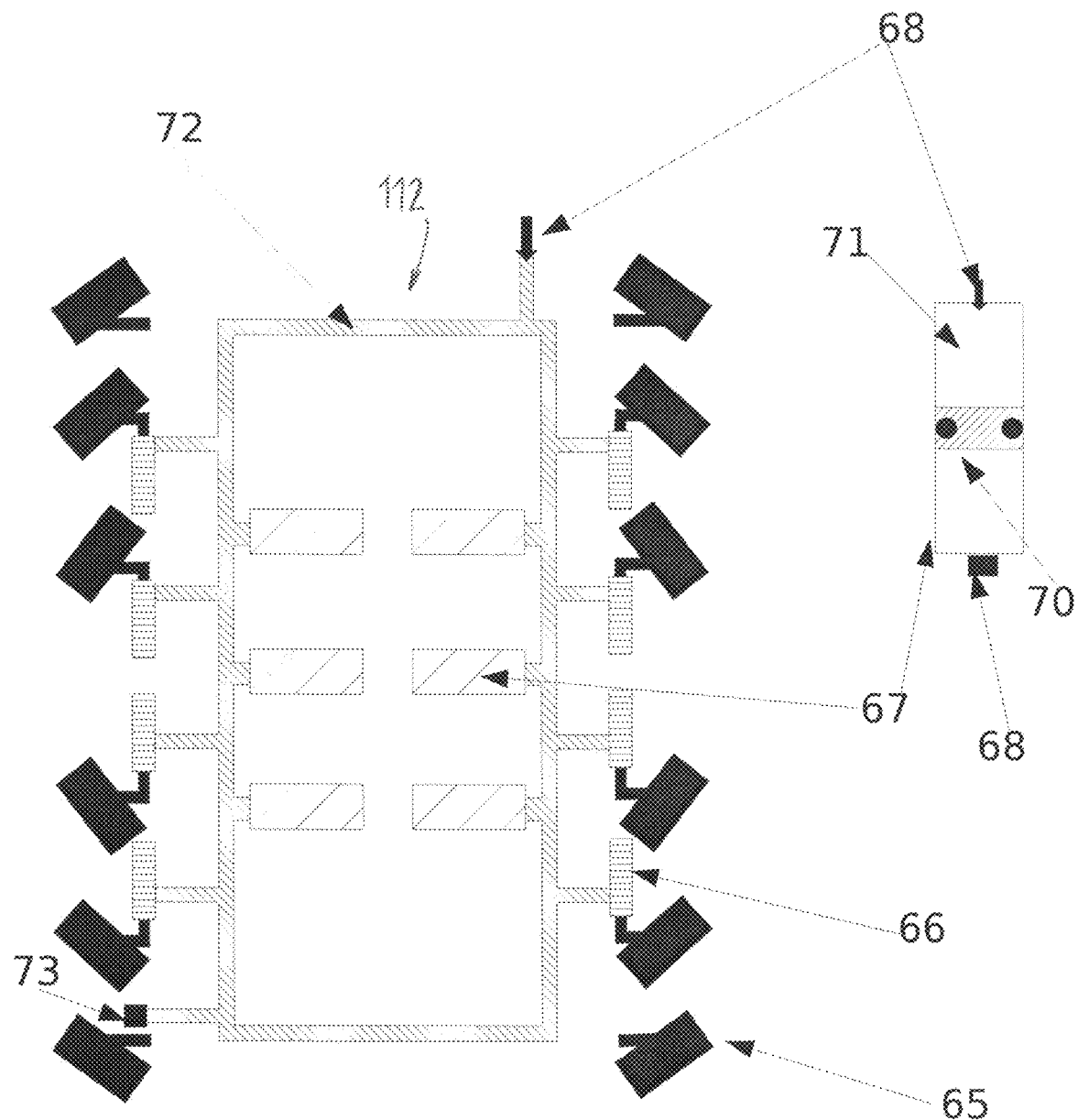

The reactor is placed on a support such as a carriage FIG. 10.112 comprising optionally orientable wheels FIG. 10.65 for following the path of the sun and combining two rotations in two horizontal and vertical perpendicular planes. Thus, the path of the sun being broken down into polar coordinates, the rotation of the carriage makes it possible to follow the horizontal path of the sun, while the inclination of the concentrators makes it possible to follow the vertical travel of the sun. The wheels will have a suspension system, preferably by means of jacks FIG. 10.66 and more particularly by hydraulic jacks coupled to hydraulic accumulators FIG. 10.67 for guaranteeing that the carriage is level.

1) In one embodiment, the functional unit allowing torrefaction and pyrolysis of the substrate is the solar/microwave furnace reactor (F_smo) comprising one or more pipes FIG. 1.4 forming the reactor proper FIG. 1.110. The pipe is for example made from silicon carbide, or silicon carbide comprising diamond nanoparticles, increasing their thermal conductivity. In other embodiments, the pipe 4 will comprise one or more layers of diamond. The pipe or pipes of the reactor will have a diameter of between 1 centimetre and 5 metres and a length of between 10 centimetres and 20 metres. In some embodiments, the pipes forming the reactor will be connected together by their end by means of connecting pieces fitted on or screwed (FIG. 2.5) that make it possible to make the pipes slide with respect to one another during the thermal expansion of the pipes. The connecting pieces will for example be made from alloy having a coefficient of expansion close to that of the pipes, for example for pipes made from silicon carbide the connecting pieces will be able to be made from Invar with a coefficient close to that of silicon. The seal at the junction of the pipes will for example be supplemented by a corrugated structure (FIG. 2.6) connecting the connecting pieces of two consecutive pipes and having a surface for sealing contact with each of the connecting pieces of the two said pipes, the contact surfaces being able to have a conical profile.

Figure 2:
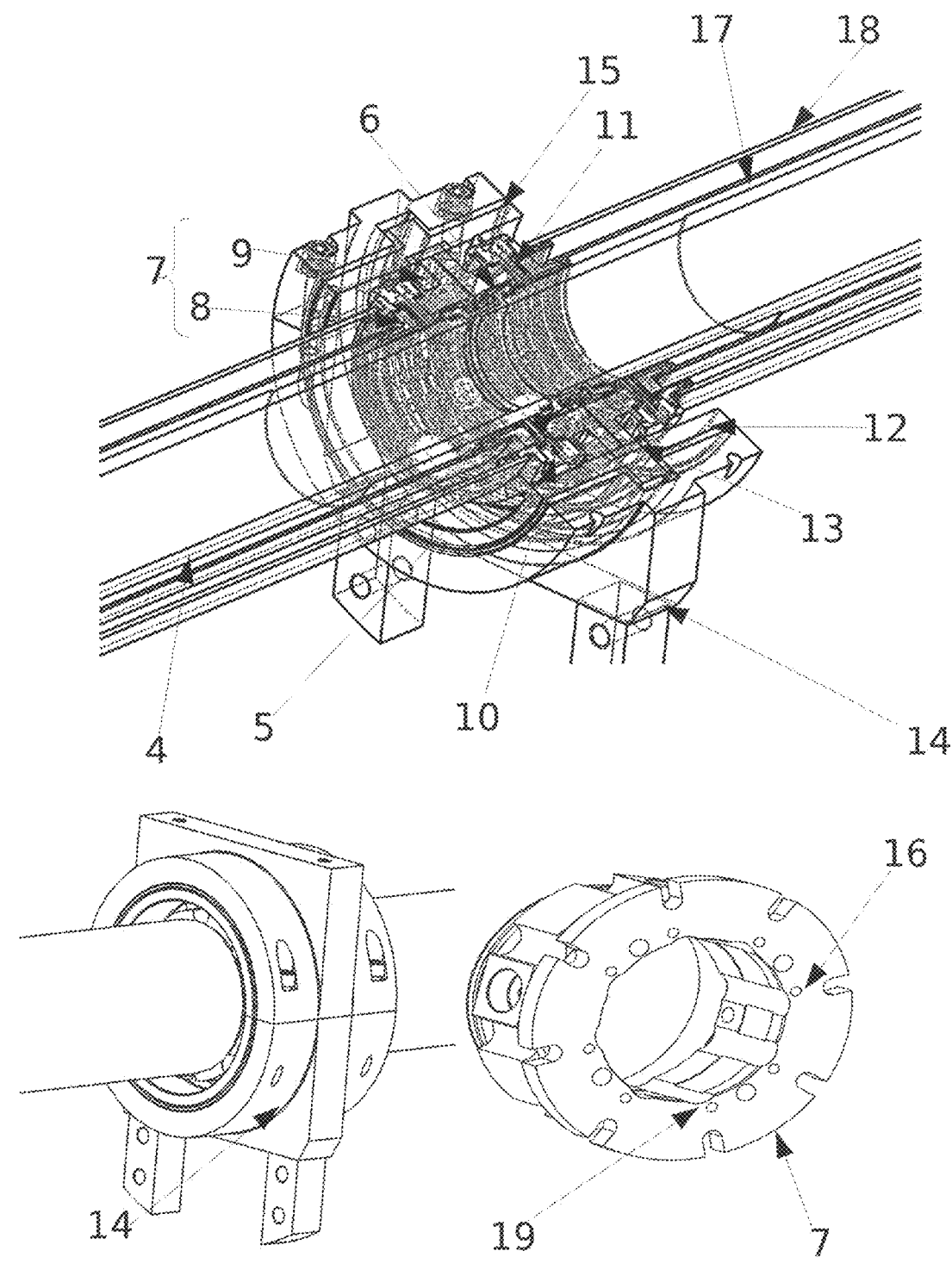
Figure 3:
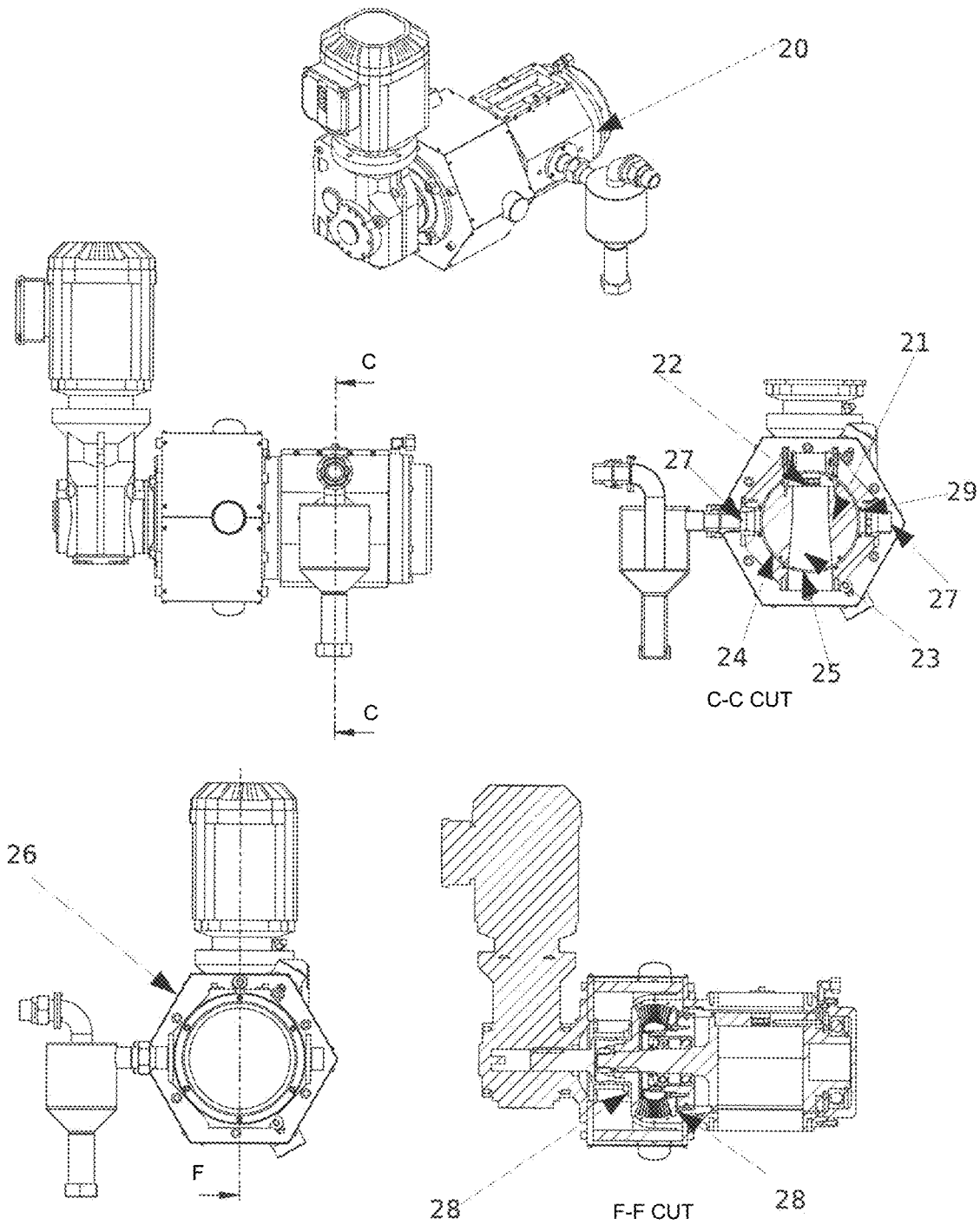
Figure 4:
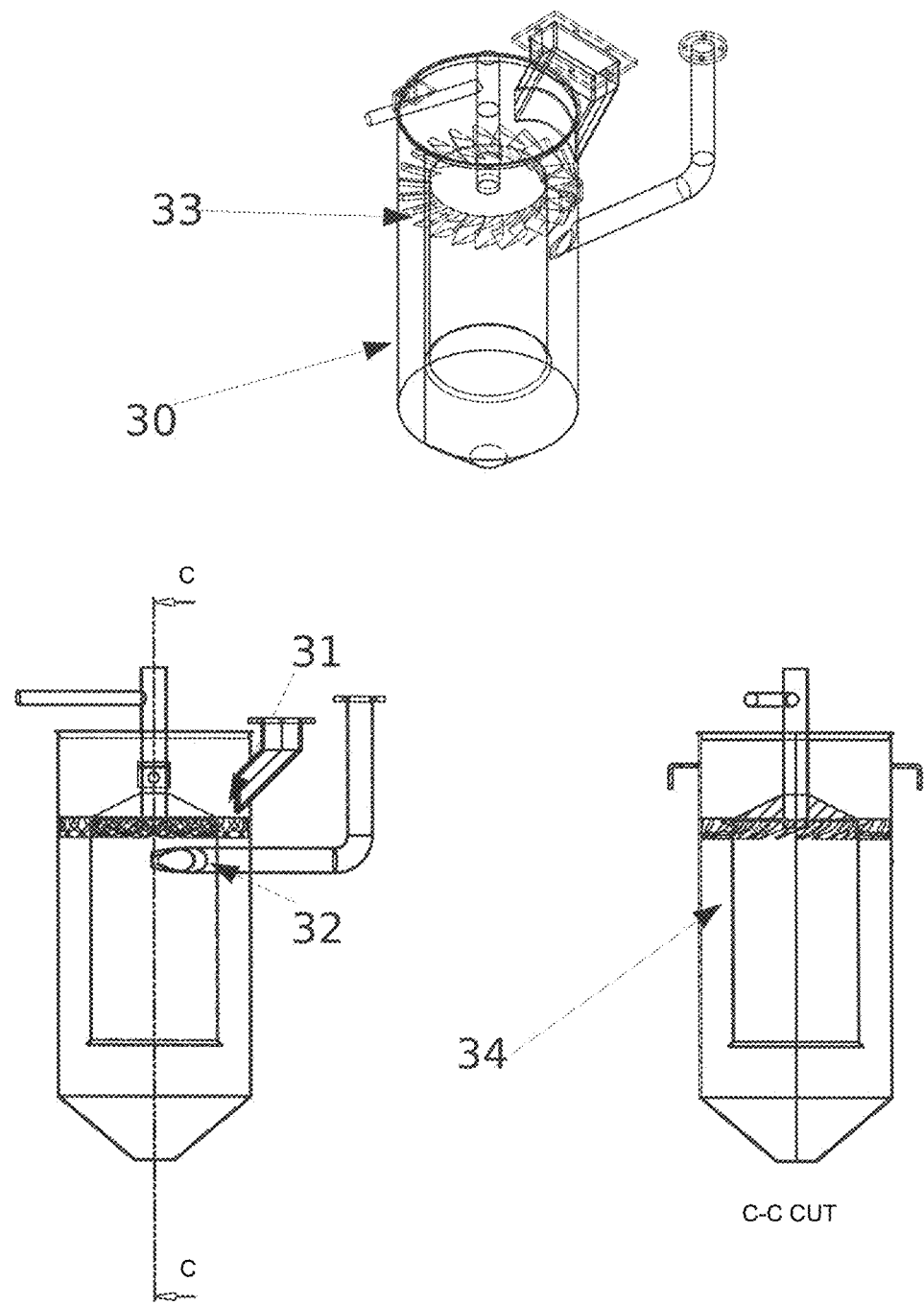

The corrugated structure will for example be included in a flange FIGS. 2.7-8-9 comprising elements for suspending the pipe FIG. 2.4.3. The suspension elements being able to comprise at least one spring FIG. 2.10 and optionally a piston FIG. 2.11. In some embodiments, the flange will be included in a metal shell FIG. 2.12 comprising joints FIG. 2.13 made from rubber or vulcanised silicone or any other polymer making it possible to thermally insulate the flange from the shell and to improve the damping of the relative movement between the reactor and the shell on the one hand and the flange on the other hand. The shell will be included in a bearing FIG. 2.14 for example made from aluminium enabling the bearing to rotate about the shell and the reactor, the shell remaining fixed. The sliding of the flange on the shell will be provided for example by means of a roller bearing or a bronze shoe (FIG. 2.15). The flange will comprise conduits FIG. 2.16 that will enable a gas to pass between the glass tubes FIG. 2.16-17 or will make it possible FIG. 2.19 to produce a vacuum between the inner glass tube and the pipe of the reactor. The bearings (intermediate and external) support a cradle comprising all the mirrors of the furnace F_smo and enable the mirrors to rotate about the reactor, the reactor remaining fixed.

Figure 9:
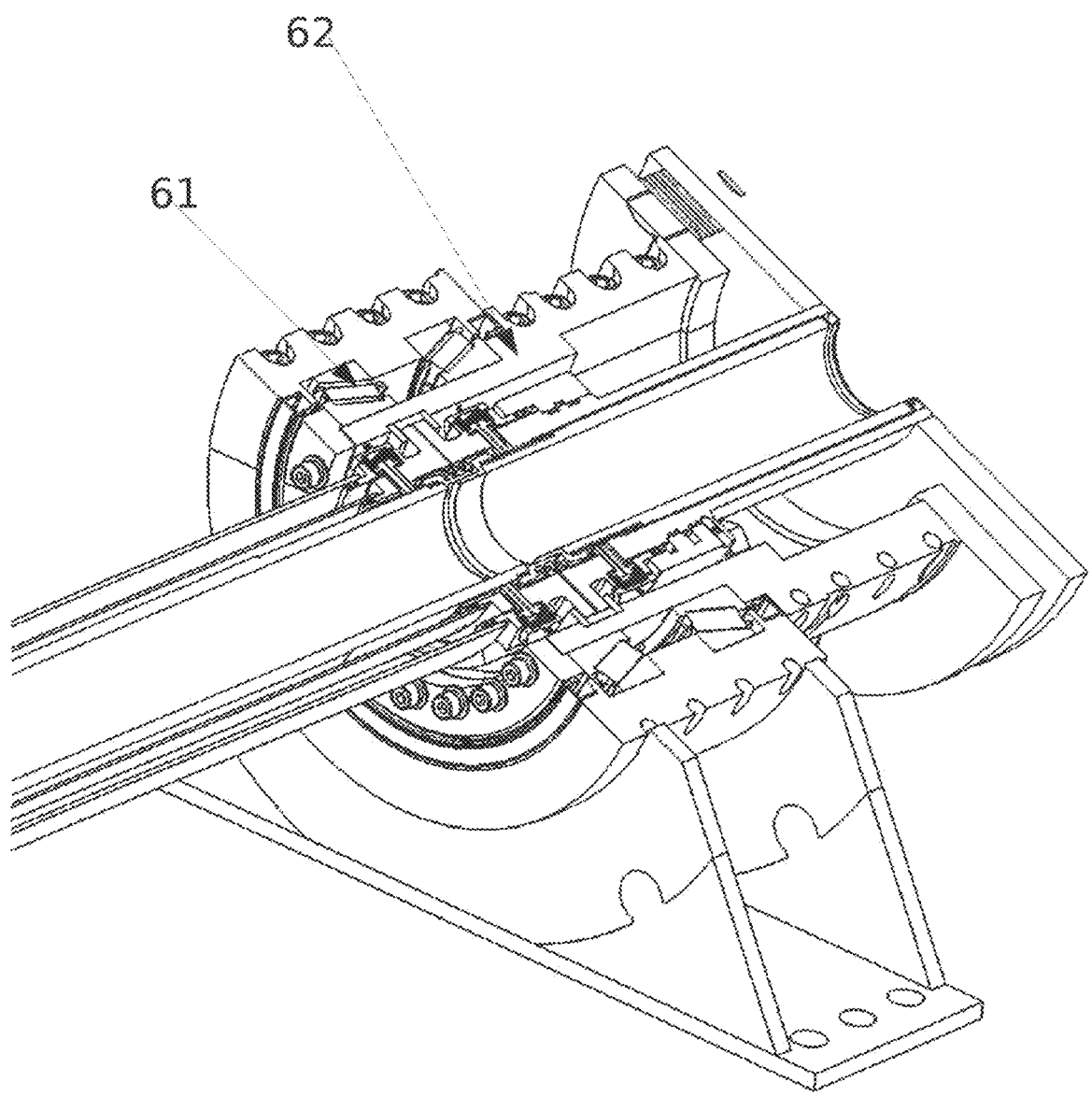

In a particular embodiment, the rotation of the mirrors enabling the travel of the sun to be followed, will comprise firstly a gearing system including a circular rack coupled to at least one pinion at each end of the reactor, and secondly rotation bearings, either external FIG. 9 at each end of the reactor, or intermediate, such that the rotation of the mirror system can take place about the reactor, the reactor remaining fixed.

2) At the entrance and exit of the reactor of the F_smo 110 systems will be disposed enabling the substrate to pass, but not the gases. The gases will enter and emerge from the reactor through one or more wells intended for this purpose. Thus the reactor will be isolated from the atmosphere by a method of loading and unloading the substrates.

2-1) At the entrance to and respectively the exit from the pipe of the reactor, there will for example be disposed a device 20, comprising two cylinders fitted together, turning in opposite directions, the innermost cylinder will be solid, and provided with a cavity 21 pierced in its bottom with a series of pores 22 opposite to the opening of the cavity 23. The outer cylinder 24, including the inner cylinder, will be provided with an opening 25 of the same size as the opening of the cavity of the inner cylinder 23. The two cylinders will be included in a cylindrical chamber 26 provided with two openings above and below of the same size as the openings of the aforementioned two cylinders, and two series of opposite pores disposed laterally in the equatorial position 27. Each series of pores of the cylindrical chamber will be disposed on an external series of bumps preventing the occlusion of the pores when crossing with the pores disposed on the inner cylinder during the rotation of the various cylinders. The inner and outer cylinders will be provided with a gearing system for example comprising two geared plates 28 making it possible to rotate them in opposite directions, by means for example at least one pinion disposed between the two plates.

In position:

a) the openings of the cylinders are aligned upwards with the opening of the cylindrical chamber, and allows filling of the cavity by the substrate;

b) by turning through $\pi/2$ in opposite directions the cavity of the inner cylinder is closed off by the outer cylinder while the pores of the bottom of the cavity are positioned facing the opening of the outer cylinder opposite the first series of bumps on the cylindrical chamber. The first series of bumps is connected to a vacuum pump voiding the atmosphere of the cavity (external atmosphere).

c) by continuing the rotations in opposite directions through $\pi/2$, the two openings of the inner and outer cylinders are aligned on the bottom opening of the cylindrical chamber, enabling the content of the cavity to be poured inside the reactor without contamination of the outside air, the pores of the bottom of the cavity being closed off by the outer cylinder;

d) by continuing the rotation by $\pi/2$, the pores of the bottom of the cavity align with the opening of the outer cylinder facing the second bump itself connected to a second vacuum making it possible to pump the atmosphere coming from the reactor to the inside of the reactor. Then another cycle recommences. The vacuums are produced by pump or Venturis pumping the atmospheres respectively to the outside and to the inside of the reactor.

The sealing of the cylinders with respect to each other will for example be provided with metal S-shaped seals 29. The cavity of the inner chamber will be connected to the blowing system making it possible to eject the substrates in the low position.

In a particular embodiment, the top cavity of the cylindrical chamber is connected to the bottom outlet of a loading cyclone.

Figure 11:
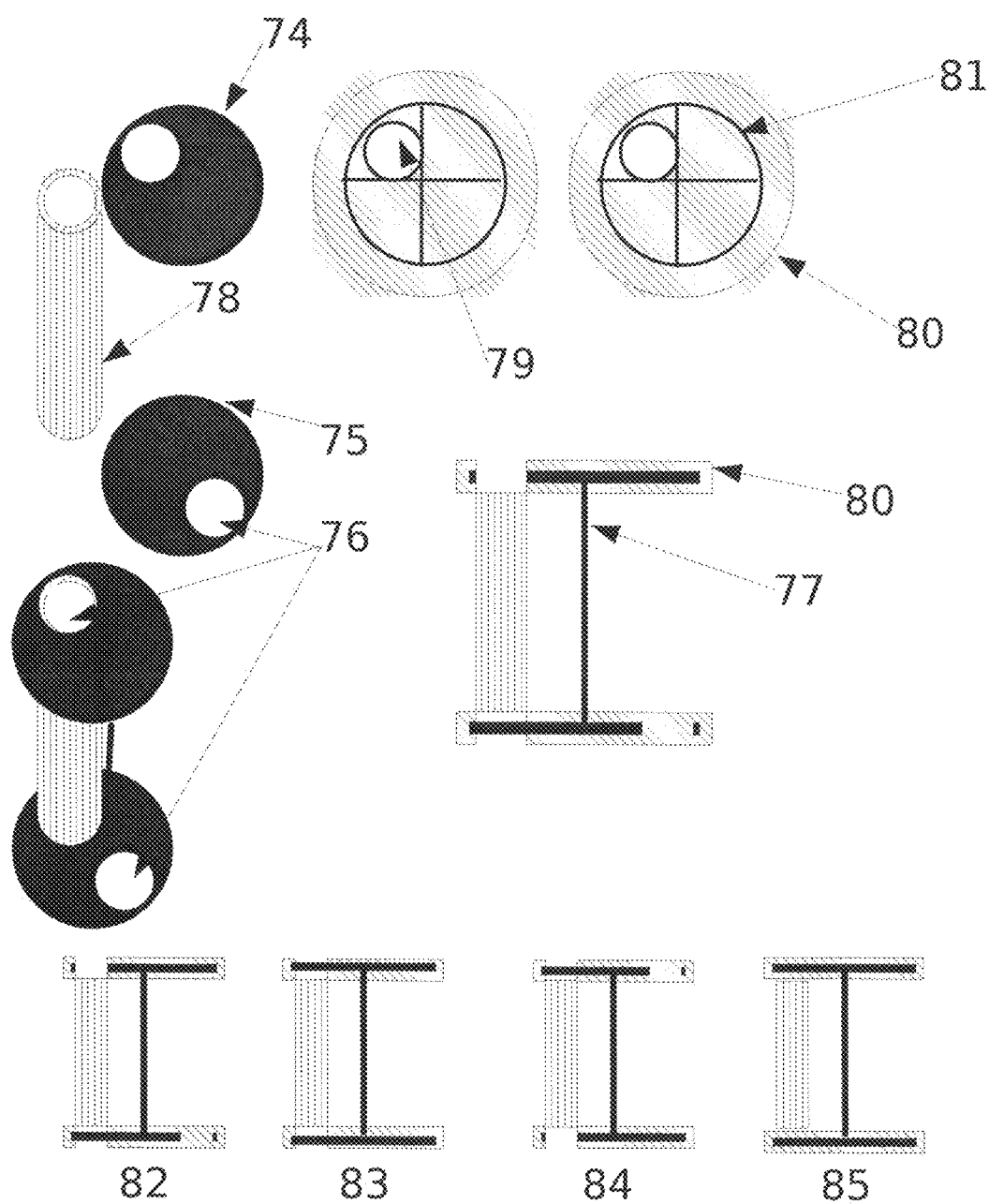

2.1.1 In a particular embodiment, the loader and/or unloader will comprise two superimposed discs FIGS. 11.74-75 such that each disc is provided with an orifice FIG. 11.77 at opposite positions between the two discs. The discs are connected by a spindle enabling said disc to turn in a connected manner FIG. 11.77. A transit tube or chamber FIG. 11.78 connects the two discs to each other so that, in turning, the opening of each of the two discs passes in alternation in front of respectively the inlet and outlet of the transit tube. The inlet and outlet of the transit tube are contiguous FIG. 11.79 with respectively the bottom face of the top disc and the top face of the bottom disc, so as to provide a seal between the two discs and the inlet and outlet of the transit tube. Each of the discs is contained in a circular chamber FIG. 11.80 comprising, on their top and bottom faces, joints forming a closed curve FIG. 11.81 so as to define at least four sectors. The sectors preferentially being superimposed between the two chambers. Turning in the trigonometric direction when the disc turns in this direction, two chambers are provided in the first sector with an orifice aligned on the transit tube, so that the substrates can pass into the transit chamber or emerge from the transit chamber. The transit tube is optionally provided with electric valves, for example three in number, making it possible to connect the transit tube to two vacuum pumps or two vacuum reservoirs and to a pressurised gas reservoir such as $CO_2$, CO or optionally argon in the context of the reduction of alumina. Connectors and end-of-travel devices control the opening and closing of the valves. In a normal functioning the openings of the discs are for example oriented at 180°.

The movement is broken down into 4 steps.

Step 1 FIG. 11.82: the opening of the top disc is aligned at the inlet of the transit tube, the outlet of this tube being closed by the bottom disc. The substrate can pour into the transit tube.

Step 2 FIG. 11.83: the two discs turn through $\pi/2$ so as to close the inlet of the transit tube, the outlet of the transit tube being closed, the valve controlling the first vacuum reservoir enables the gases to be discharged from the transit tube to a first enclosure.

Step 3 FIG. 11.84: the two discs turn through $\pi/2$ once again so as to open the outlet, the inlet being closed, the granulate pours out of the transit tube, the emptying is optionally accelerated by a gas jet, a gas valve opening at this moment.

Step 4 FIG. 11.85: the two discs turn through $\pi/2$ so as to close the outlet of the transit tube, the inlet of the transit tube being closed, the valve controlling the vacuum of the second vacuum reservoir enables the gases to be discharged from the transit tube to a second enclosure.

In some embodiments, a conduit or opening of the second top and bottom chamber sector of the discs makes it possible to discharge the substrate arriving in this sector.

Figure 12:
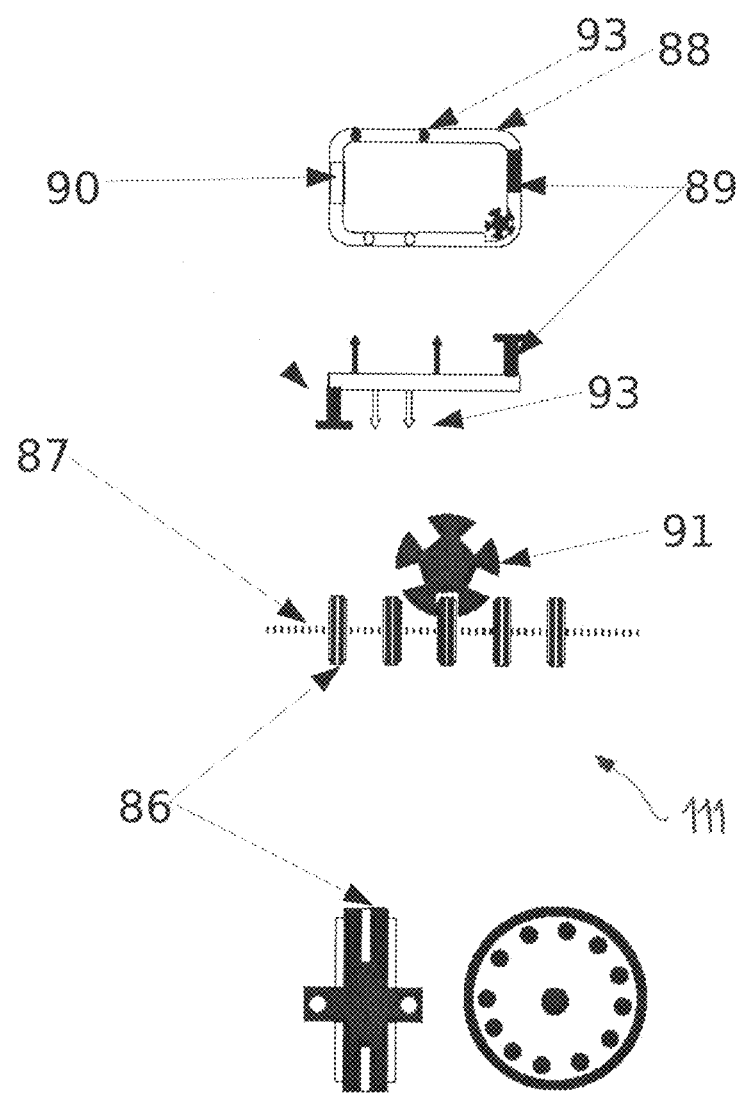

2.1.2 In some embodiments the loader and/or unloader comprises a system of successive palets FIG. 12.86 connected between them by a cable or a chain FIG. 12.87 such that the palets are adjusted to the inside diameter of the tube forming a circuit FIG. 12.88. The tube forming the circuit comprises an inlet FIG. 12.89 through which the substrate can enter and an outlet FIG. 12.90 for pouring the substrate into the reactor. The palets are disposed on a chain or a cable so as to form a loop in the circuit. The substrate pouring at the inlet is trapped between two palets, which lead it as far as the discharge from the circuit. Valves upstream FIG. 12.92 and downstream FIG. 12.93 of the outlet connect to two separate vacuum pumps or chambers for discharging the external atmosphere or the atmosphere of the reactor so as to prevent the air from entering the reactor for the gases of the reactor to emerge into the external atmosphere. A valve connected to a compressed gas, $CO_2$, CO or argon, facilitates the transfer of the substrate into the reactor. A motor connected to a toothed wheel FIG. 12.91 circulates the palets in the circuit through the reactor. The palets may be made from metal, but preferentially ceramic or a metal/ceramic stack.

2.2. In a particular embodiment, the device for discharging the substrates at the outlet from the discharger will comprise a system of cyclones. In a particular configuration, the system of cyclones will consist of a discharge cyclone 30 with a dual inlet, longitudinal 31 for the substrates and tangential 32 for the gases. The longitudinal inlet of the cyclone will comprise inclined paddles 33 so as to allow the liquid and substrates to pass, orienting them in the direction of rotation of the vortex that will be caused by the cone of the cyclone. A pipe 34 recovers the gases rising in the central gas column formed in the cyclone and conducts them through the reservoir to the other units. A tapping 35 situated at the end of the reactor pipe recovers the gases circulating in the reactor and leads them to the tangential inlet 32 of the cyclone. Under the action of these gases, a descending vortex will form in the cyclone, entraining the substrates to the bottom outlet of the cyclone while the gases will rise in a central column to the recovery pipe.

Figure 5:
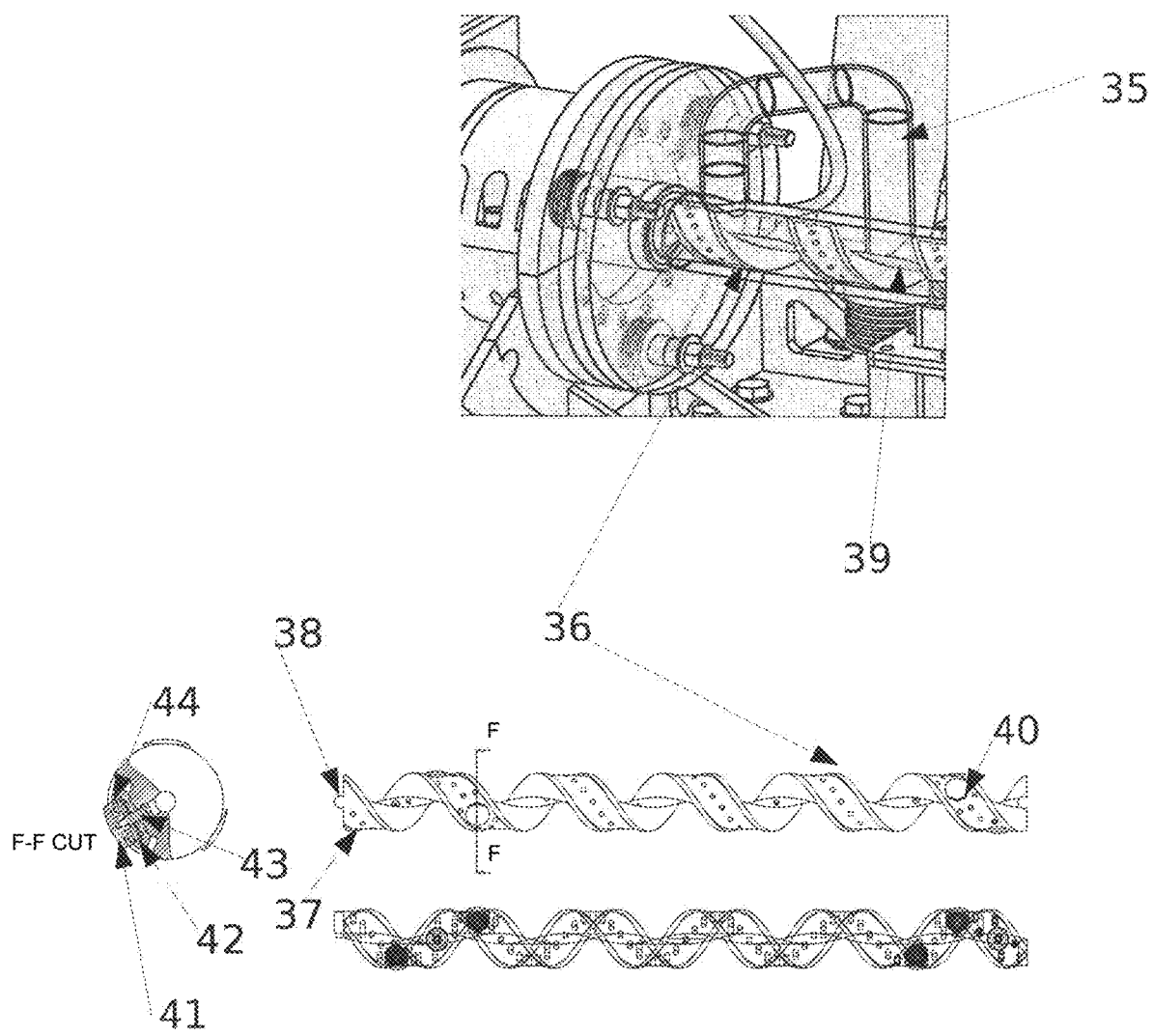

2.3 At the entre of the pipe of the F_smo 110, a worm FIG. 5.36 is disposed, enabling the substrates to be treated to advance along the aperture of the pipe. In a preferential embodiment, all or part of the worm will comprise bottle brushes FIG. 5.37 or brushes the bristles of which will be made from ceramic, vulcanised silicone, metal or any other heat-resistant material. In some embodiments, the bristles of the brush will be made from nickel alloy and will be sufficiently long to scrape the internal wall of the pipe of the F_smo. This makes it possible firstly to prevent the formation of scale and secondly allows the free circulation of the gases in the pipe and the advance of the substrate by means of the rotation of the worm. In some embodiments the worm will comprise a plurality of pieces connected together by a dovetail 38. In an even more preferential embodiment the worm will be fitted on a central shaft.

2.4 In an even more preferential embodiment, to allow rotation of a large worm or screw inside the reactor, the worm will comprise sliding and damping shoes 40. The shoes will comprise a sliding shoe preferably made from ceramic 41 but which can be made from metal or any other material providing sliding, a spring and optionally a guide spindle for the spring body 43. These shoes serve both for the sliding by virtue of the ceramic and for suspension by virtue of the spring, thus enabling the worm to turn in the reactor with a minimum amount of friction.

Figure 6:
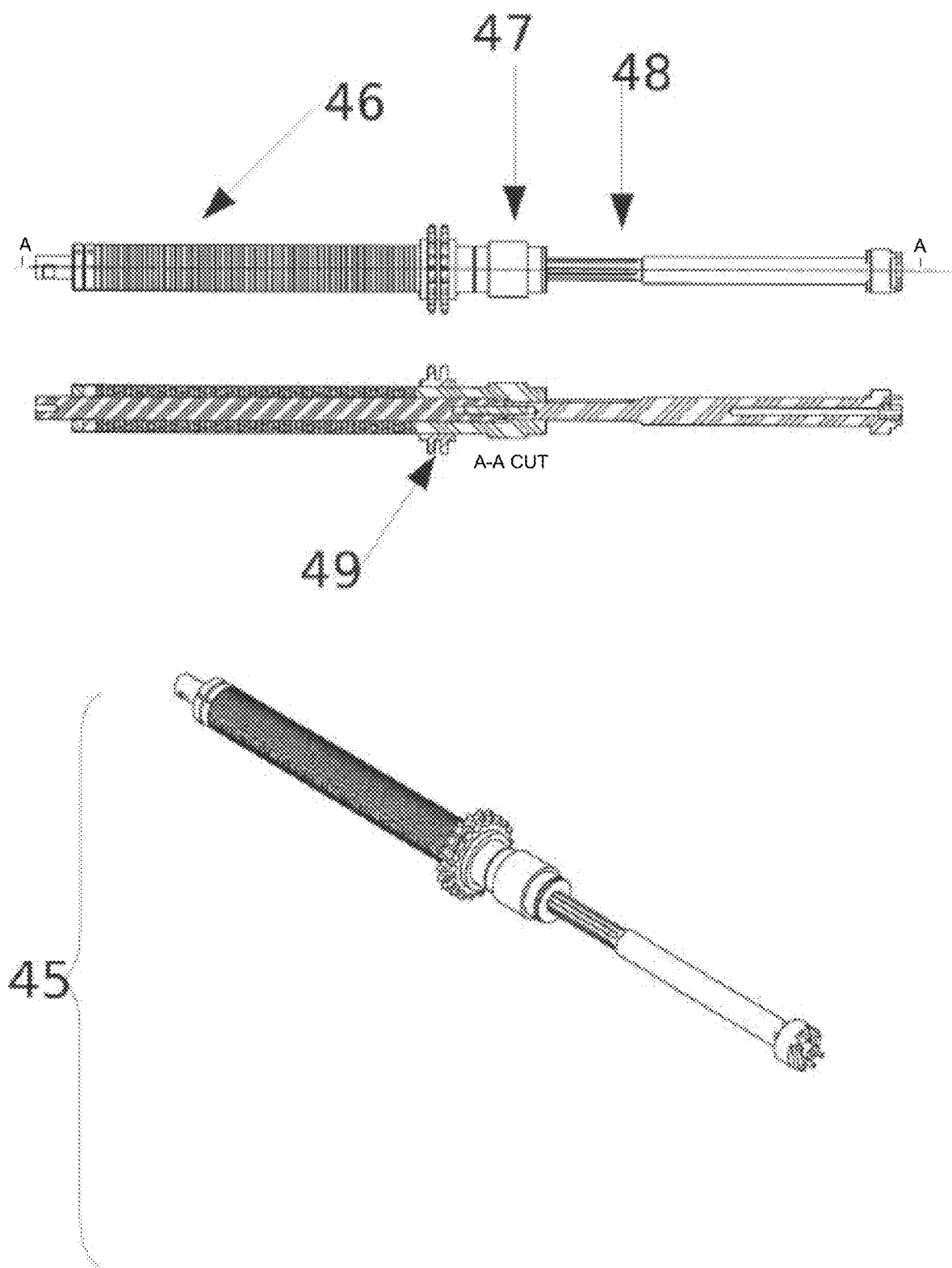
Figure 7:
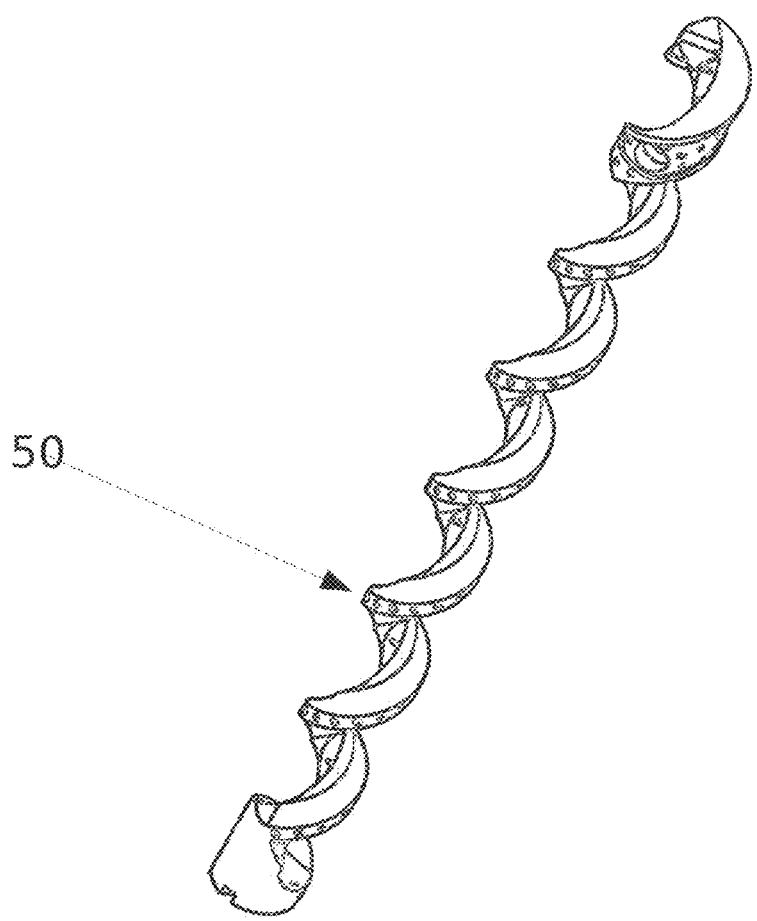

2.5 In some embodiments, the worm will be tensioned in the reactor at a tension varying from 1 kg to 10 tonnes. The tensioners FIGS. 6.45-46-47-48-49 disposed at the end of the worm will comprise Belleville washers.

2.6 The part of the worm disposed facing the magnetrons will be bevelled 50 and will optionally have a copper scraper.

Figure 8:
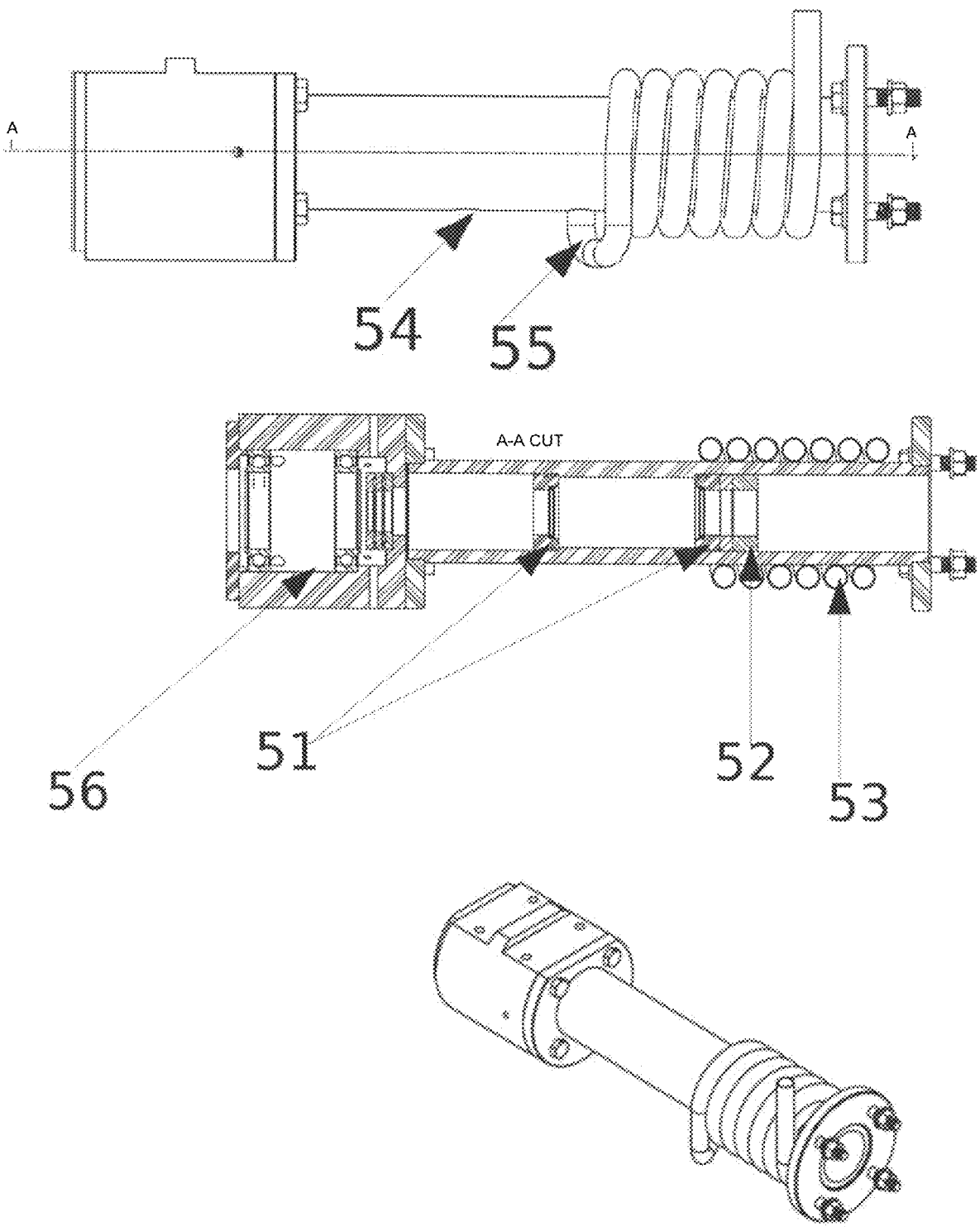

2.7 In a particular embodiment, at least one rotating or optionally rotating joint 51 will be disposed at at least one end of the worm. In a particular embodiment, at each end of the worm joints FIGS. 8.51-52 are disposed, confining a cooling oil that circulates in an exchanger FIGS. 8.53-54-55. The confined oil cools the end of the worm and makes the end of the reactor fluidtight while enabling the worm to rotate in the reactor.

2.8 In some embodiments, at least one bearing 56 at at least one end of the worm guides the rotation of the worm and provides abutment for the tension of the screw through the Belleville washers.

2.9 In some embodiments, the worm will be in a plurality of parts fitted together by means of dovetails, each part of the worm preferentially being positioned along an axis passing through the cylindrical reactor. In this embodiment, part of the worm will be made from ceramic, in particular the part of the worm in contact with the reactor.

In some embodiments, the elements of the worm are held on each other by means of keys.

2.10 In some embodiments, the worm is replaced by a system of successive palets FIG. 12.86 connected together by a cable or by a chain FIG. 12.87. The palets will be adjusted to the inside diameter of the reactor so that the substrate trapped between two palets can be pushed through the reactor in order to pass through it. Preferentially, the palets are disposed on a chain or cable so as to form a loop and preferentially will be included in a closed chamber. The palets may be made from metal, but at present ceramic or a metal/ceramic stack. At the end of the reactor, tubes will preferentially be disposed, made from Teflon, Viton, vulcanised rubber, silicon or any other polymer material able to provide a seal between the palets and the tube of the reactor. The tubes disposed at the end of the reactor produce a circuit for the palets connected by a cable or circular chain in order to produce a conveyor 111. At least one motor and at least one toothed wheel make the conveyor circulate.

In some embodiments, the worm or cable of the palets will have an electric current pass through it so as to heat the screw or cable and the palets by Joule effect. The device used for the transit of the substrates can then participate in the heating and curing/pyrolysis of the substrates.

3. In some embodiments, the pipe of the reactor F_smo (110) will be included in a transparent confinement chamber FIGS. 1.17-18 under vacuum with double walls. The space between the wall closest to the reactor and the reactor will be kept under vacuum whereas in the space between the two walls a confinement gas circulates, such as a greenhouse-effect gas such as $CO_2$ or methane or carbon monoxide CO for recovering heat. The circulation of the gas between the various sections of the reactor will be allowed by the pores included in the flanges FIG. 1.16, whereas the vacuum will be able to be achieved by means of the conduits produced in the flanges FIG. 1.17.

4. Outside the pipe and the glass confinement, in the length. one or more cylindroparabolic FIG. 1.3 and/or cylindrocircular FIG. 1.57 solar mirrors or concentrators are disposed, for example made from aluminium or metallised glass or any other reflective material for making the sunlight converge on the surface of the pipe of the reactor and making the light reflected by the confinement tubes or the tubes of reactor converge once again on the reactor. The pipes of the reactor will preferably be matt black in colour, affording a maximum absorption of the light and heat from the solar radiation. In a particular embodiment, the pipe of the reactor will consist of or comprise silicon carbide. In other embodiments, the pipe of the reactor will comprise nanodiamond particles or will consist of nanodiamonds agglomerated or bound by the silicon carbide binder or other ceramic or metal binder such as copper. Vertically in line with the shadow zone above the worm pipe a metal plate FIG. 1.58 is disposed, preferably made from copper or aluminium covered with a block of glass or any other transparent material so that a vacuum is created between the glass block and the metal plate. At least one metal tube FIG. 1.59 is disposed under the metal plate, so that the metal tube is thermally connected to the metal plate in such a way that the gas circulating in the metal pipe recovers the heat from the solar radiation captured by said plate. The gas circulating in the pipe situated under the metal plate and the gas circulating between the two glass confinement tubes are reinjected into the reactor.

5. Magnetrons FIG. 1.60 that inject microwaves with a frequency of between 1 gigahertz and 300 gigahertz in the reactor tubes are disposed at the head of the reactor. The number of microwave sources, between one and several tens, will depend on the required power and the electrical consumption envisaged for the installation. The microwaves may be replaced by any type of wave able to heat the water molecules or the molecules having a dipolar moment, constant or caused for example by infrared radiation.

In a preferential embodiment, the microwave source is a magnetron F that will have a waveguide merging with the gas guide forming a mixed guide. The gas guide makes it possible to inject into the reactor the gas coming firstly from the space between the two glass confinement tubes and secondly from the tube or tubes situated under the metal plate vertically in line with the reactor. The angle of installation of the waveguides, and of the gas guide in the mixed guide, as well as the flow of gas coming from the gas guide, will prevent the entrance into the waveguide of the substrate and the gases circulating in the aperture of the F_smo. In a particular embodiment, a porthole made from quartz or alumina or other ceramic transparent to microwaves is disposed in the waveguide before the gas entrance. In some embodiments, the porthole may be replaced by or supplemented with a ceramic tube transparent to microwaves such as zirconium oxide doped with magnesia introduced into the reactor.

6. The conduits and/or the shaft of the screw or any other part of the reactor will optionally become connected to ultrasound sources in order to prevent the formation of scale at this level. The microwaves cause very rapid heating of the molecules of the substrate, by agitating the water molecules and other polar molecules contained in the substrate. The microwaves may optionally be supplemented by infrared radiation. The heat produced by the microwaves added to the convergence heat of the solar radiation and that accumulated in the circulating gas causes torrefaction and pyrolysis of the substrate. During this pyrolysis, a release of volatile materials containing tar as well as various other inflammable gases occurs. These various gases are recovered by the tapping in the degassing chimneys 35 in order to be injected into a gasification reactor after separation of the gases and synthetic coal in the discharge cyclone. Before they are injected into the gasifier, these gases may be superheated (between 160° C. and 2000° C.) by the addition of microwaves and heat of solar origin.

7. In some embodiments, the substrate comprises the elements necessary for producing an electrolysis bath for producing aluminium by electrolysis, for example a mixture formed by any combination of NaF, KF, AlF$_3$, AlCl$_3$, Na$_3$AlF$_6$, NaCl or C, in proportions varying for example from 0 to 50% by mass supplemented by alumina Al$_2$O$_3$. The mixture, during its transit in the reactor, will be raised to temperatures above 950° C. by the action of the microwaves and/or solar radiation, so as to obtain a heterogeneous molten salt or a heterogeneous partially molten salt forming an electrolysis bath or medium for reducing alumina into aluminium.

The mixed molten or semi-molten salt will be able to undergo conventional electrolysis such as that described for the reduction of alumina.

In a particular embodiment, the electrolysis will be carried out directly in a part of the furnace. In this particular embodiment, the part of the furnace intended for reducing alumina will comprise a peripheral electrode FIG. 13.94 at the wall of the reactor FIG. 13.97, preferentially cylindrical, at a negative potential, for example at a potential of between 1V and 10 kV (negative electrode or cathode) with respect to the shaft of the worm FIG. 13.95 or of the cable or of the chain connecting the palets for transporting the substrate in the reactor. The cable or chain of the palets or the shaft of the screw will then form a central positive electrode. The peripheral negative electrode preferentially forming a metal tube or a portion of a metal tube lining the wall of the reactor. In an even more preferential embodiment, the electrodes will be made from tantalum, platinum, tantalum alloy, tantalum/platinum alloy or tantalum/platinum/iron alloys such as alloys of the 310 type enriched with tantalum and/or platinum. In some embodiments, the negative electrode is disposed under a carbon cylinder FIG. 13.96 such that the carbon forms a consumable electrode.

Figure 13:
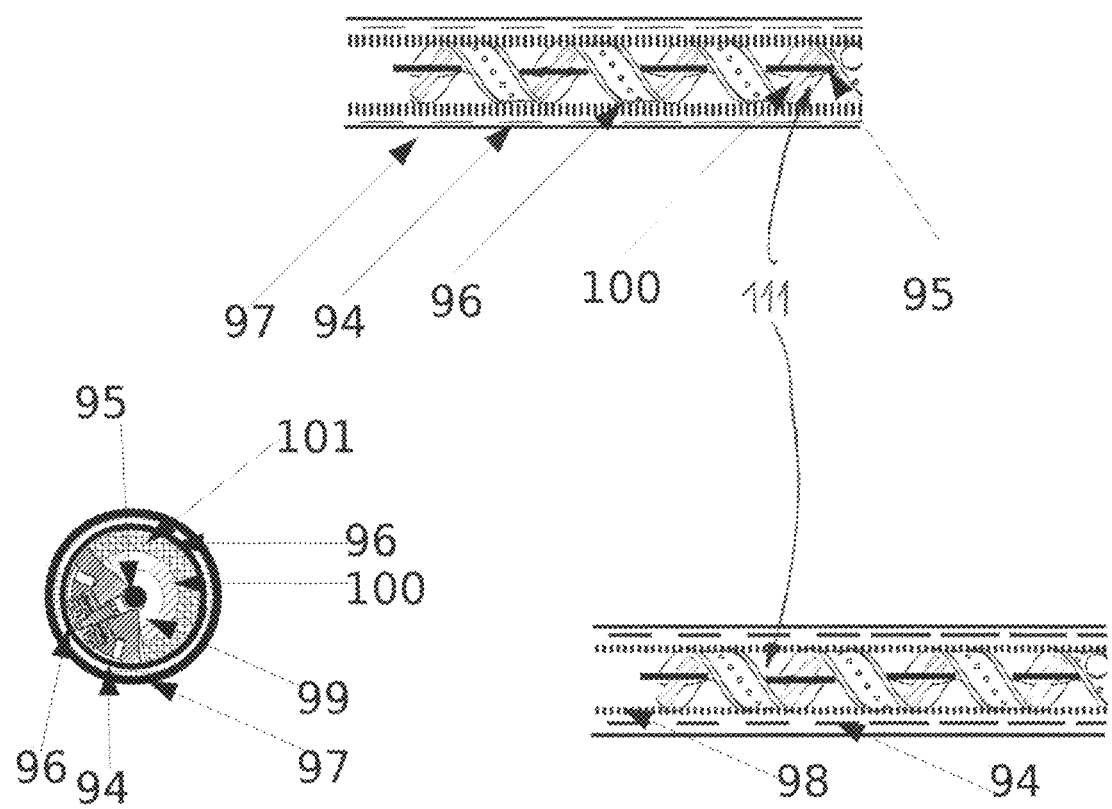

In some embodiments, between the negative electrode and the worm or the palets of the conveyor 111, a cylinder made from porous ceramic FIG. 13.98 is introduced such that there exists preferentially a space between the cylindrical negative electrode 94 and the porous ceramic cylinder 98. The porous ceramic cylinder will comprise at least one porous part preferentially disposed towards the bottom face of the cylinder with respect to the reactor. Carbon powder will be injected into the space situated between the negative electrode and the porous ceramic tube, the powder will be injected for example by means of an argon gas so that the carbon powder optionally rises at the core of the reactor through the pores of the porous ceramic cylinder.

In other embodiments, the shaft of the worm 95 of the reactor or the chain or the cable FIG. 14.102 of the conveyor FIG. 14.111 with palets 103 will be a positive anode electrode made from tantalum, platinum, tantalum alloy, tantalum/platinum alloy or tantalum/platinum/iron alloy such as alloys of the 310 type enriched with tantalum and/or platinum. The edges of the worm 99 and the external structure of the palets preferentially made from ceramic will comprise carbon insets 100 serving as a consumable electrode. The metal parts of the conveyor 111 will preferentially be covered with an electrically-insulating ceramic 101, optionally flexible, so that the carbon inserts form the anode, electrical conductors in contact with the electrolysis bath.

The substrate circulating in the electrolytic part of the reactor is subjected to an electrical field preferentially between 5V and 200 kV and has an electric current with an intensity preferably between 100 and 100,000 A running through it, which passes between the positive electrode and the negative electrode, so as to have a current density great than 0.1 A/cm$^2$.

Under the action of the current, the electrolytes in the molten or semi-molten salts react so that at the anode the following reaction occurs

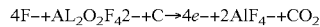

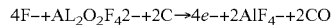

whereas at the cathode the following reaction occurs:

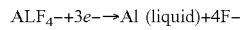

In other embodiments, the part of the cylindrical reactor for reduction of alumina is in two parts 105a, 105b, which, fitted together, form a cylinder preferably made from ceramic FIG. 14.105. At least one anode electrode 106 is positioned on the top part 105a of the reactor forming a semi-cylinder. Another cathode electrode 107 is disposed on the bottom part 105b of the reactor. Two consumable carbon electrodes 108 forming cylinder portions are disposed on the anode and cathode metal electrodes. Two bands of ceramic forming cylinder sectors 109 separate the electrodes in order to insulate them electrically from each other. The conveyor insulated from the top and bottom electrodes transports the substrate between the two electrodes, thus enabling the alumina to be reduced.

At the discharge from the reactor the more dense reduced aluminium will be recovered at the bottom outlet of a cyclone while the less dense electrolysis liquid and optionally the carbon injection gases can be recovered through the rising tube of the cyclone.

8. In some embodiments, the solar/microwave furnace optionally supplemented by the Joule effect of an electric current passing through the conveyor will be used for recycling aluminium from aluminium waste, by means of the fusion of said waste passing through the solar reactor.

LEGENDS FOR ALL THE FIGURES 1) lifting system actuated by motors
2) articulated system and jacks for unfolding and refolding the mirrors
3) cylindroparabolic solar concentrator mirror
4) pipe of the solar/microwave furnace reactor (F_smo)
5) fitted-on or screwed connecting pieces of a reactor pipe
6) corrugated structure (FIG. 2.6) connecting the connecting pieces of two consecutive pipes
7) flange in a plurality of parts FIG. 2.7 comprising suspension elements
8) internal part of flange 7
9) external part of flange 7
10) spring suspension element
11) piston suspension element
12) metal shell
13) suspension and thermal insulation joint
14) intermediate bearing
15) bronze shoe
16) passage for gas
17) interior confinement gas tube
18) exterior confinement gas tube
19) passage for vacuum
20) substrate loader or unloader
21) inner cylinder loader provided with a cavity
22) pores disposed opposite the opening of the cavity 23
23) cavity opening
24) external cylinder loader
25) external cylinder opening
26) cylindrical chamber 27) opposing pores disposed laterally in an equatorial position
28) plates with meshing
29) S-shaped metal joint
30) double-input unloader
31) longitudinal entry for substrates
32) tangential entry for gases
33) inclined paddles, longitudinal entry
34) pipe for recovering rising gases
35) tapping situated at the end of reactor pipe
36) worm or screw in its reactor
37) location of brush
38) dovetail
39) worm shaft
40) sliding and damping shoe
41) sliding shoe preferably in ceramic
42) shoe spring
43) shaft
44) sole plate
45) tensioner
46) Belleville washer
47) tensioner abutment
48) driving fluid compensating for expansion
49) meshing driving screw
50) worm part disposed opposite bevelled magnetrons
51) seal at end of screw
52) metal and ceramic seal and heat shield
53) heat exchanger
54) oil inlet
55) oil outlet to heat exchanger
56) bearing
57) cylindrocircular mirror
58) metal plate (copper or aluminium) covered with a slab so that there is a vacuum cavity between the slab of glass and the metal plate
59) structure supporting the reactor including the metal gas-circulation tubes
60) magnetron
61) roller bearing
62) rotation shaft
63) screw drive
64) drive
65) orientable wheels
66) jacks
67) hydraulic accumulators
68) valve
69) non-return valve
70) sealed piston
71) pressure gas
72) hydraulic circuit
73) plug
74) top superimposed discs
75) bottom superimposed discs
76) disc orifice at opposing positions between the two discs 74-75
77) shaft connecting the top and bottom discs
78) transit tube
79) transit tube joins are contiguous
80) circular chamber
81) joints forming a closed curve so as to define four sectors in the circular chamber
82) open top disc aligned at the inlet to the transit tube, the outlet of this tube being closed
83) closed inlet and outlet of transit tube
84) open outlet of transit tube, the inlet being closed
85) closed transit tube
86) conveyor palet
87) conveyor chain or cable
88) conveyor circuit
89) inlet
90) outlet
91) toothed wheel
92) upstream valve
93) downstream valve
94) peripheral and negative or cathode electrode
95) central positive anode electrode
96) cathode consumable electrode
97) wall of reactor
98) porous ceramic cylinder
99) worm covered with ceramic
100) carbon insert serving as consumable electrode
101) edge of worm covered with electrically insulating ceramic
102) cable of palet conveyor
103) palet
104) edge of palet covered with electrically insulating ceramic
105) reactor in two parts, respectively top 105a and bottom 105b which, fitted together, form a ceramic cylinder
106) anode position on the top part of reactor
107) cathode disposed on the bottom part of reactor
108) consumable carbon electrodes
109) ceramic bands forming a cylinder sector
110) reactor; solar/microwave furnace (F_smo)
111) conveyor
112) carriage

The invention claimed is:

1. A microwave thermosolar method implemented in a tubular reactor including a conveyor, the method comprising:
conveying substrates in the conveyor, the substrates comprising alumina and at least one material other than alumina;
circulating an electric current in the conveyor, in order to produce heat in the conveyor by Joule effect; and
fusing the substrates, so that an electrolysis bath is obtained in which electric current is circulating, the electrolysis bath comprising aluminum issued from a reduction of the alumina into aluminum, under action of the electric current circulating in the electrolysis bath.

2. The method according to claim 1, wherein one of the substrates contains aluminum that is fused in the tubular reactor, under action of at least one energy from solar energy, microwave energy, and thermal energy produced by the circulation of said electric current in the substrate conveyor.

3. The method according to claim 1, wherein the conveying comprises conveying said substrates along a helical worm by rotating the helical worm.

4. The method according to claim 1, wherein said method induces, in the substrates, under the action of the electric current, at least one of a curing, pyrolyses, gasifications, fusions, and chemical reactions comprising oxidation-reduction reactions.

5. A method for conveying substrates in a microwave thermosolar device including a tubular reactor including a conveyor, said substrates being defined as materials thus conveyed, the method comprising:
conveying said substrates by a system of successive conveyor pallets connected together by one of a cable and a chain, said conveyor pallets being adjusted to an inside diameter of the tubular reactor so that the substrates are trapped between two successive conveyor pallets and are pushed through the tubular reactor in order to traverse the tubular reactor.

* * * * *